United States Patent Office 3,277,090
Patented Oct. 4, 1966

3,277,090
1:4-BENZODIOXAN DERIVATIVES
Burton K. Wasson, Valois, Quebec, and John M. Parker, Montreal, Quebec, Canada, assignors to Charles E. Frosst & Co., Montreal, Quebec, Canada, a corporation of Quebec
No Drawing. Filed July 9, 1963, Ser. No. 293,886
Claims priority, application Great Britain, July 16, 1962, 27,288/62
22 Claims. (Cl. 260—247.5)

This invention is concerned with the preparation of novel 1:4-benzodioxan derivatives of the general formula:

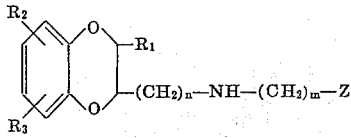

and their acid addition salts. In the above formula, $R_1$ is hydrogen, alkyl or alkoxy, $R_2$ and $R_3$ are the same or different and each represents a hydrogen or halogen atom or an alkyl or alkoxy group, $n$ represents an integer from 1 to 5, $m$ represents 0 or an integer from 1 to 5, and Z represents a 5 or 6 membered, saturated or unsaturated, nitrogen-containing heterocyclic group which may carry one or more alkyl substituents, joined to the

group through a carbon or nitrogen atom.

The compounds of the above general formula may be prepared in any of several desired ways. A suitable method is as follows:

1:4-benzodioxans of the general formula:

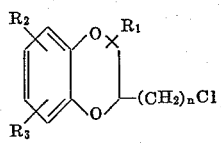

in which $R_1$, $R_2$, $R_3$ and $n$ having the above meanings, are condensed with a primary amine of the general formula $NH_2(CH_2)_m$—Z in which $n$ and Z have the above meanings. The condensation can take place by heating in the presence or absence of an inert solvent, however preferably the amine serves as the solvent vehicle. Isolation of the compounds so obtained is by distillation after the mixture has been made alkaline, or crystallization of the acid addition salts.

The compounds according to the invention are generally used in the form of their acid addition salts, preferable as the hydrochloride. They possess strong adrenolytic properties as shown by their blockade of epinephrine. In addition the compounds show central adrenergic blockade in their ability to block parachlorophenylethylamine and mescaline.

These drugs are of value for use in the psychiatric treatment of excitation states and should also prove useful in the treatment of amphetamine poisoning.

As can be seen from the following résumé, the compound 2-(3-pyridylmethylaminomethyl)-1,4-benzodioxan was tested in mice, rats, cats and dogs with the noted results:

TABLE I

Mice:
- Acute toxicity, $LD_{50}$, mg./kg., I.P. _____ 310
- Paralytic dose, $PD_{50}$, mg./kg., I.P. _____ 170
- Audiogenic seizure reduction, mg./kg. _____ 50
- Amphetamine excitement blockade, mg./kg., I.P. _____ 12.5

Rats: Parachlorophenylethylamine blockade, mg./kg., I.P. _____ 50

Cats:
- Parachlorophenylethylamine and mescaline blockade, mg./kg., I.P. _____ 25
- Adrenaline blockade, mg./kg., I.V. _____ 5

Dogs:
- Epinephrine and nor-epinephrine pressor responses blockade for 8 hours (blood pressure slightly lowered) mg./kg., orally _____ 100
- Epinephrine and nor-epinephrine pressor responses blockade for 4 hours mg./kg., orally  25

Further pharmacological testing on some of the compounds of the invention is shown in Table II.

TABLE II.—COMPARATIVE TEST RESULTS

| Cpd. Code | Reserpine Reversal Test | Adrenergic Blocking Test | $LD_{50}PD_{50}$ | $ED_{50}$ Spontaneous Activity Test | K6 Antagonism |
|---|---|---|---|---|---|
| W.327 | $ED_{50}$=7.3 mg./kg. | Cat—Blocked 1 mg./kg. Reversed 2 mg./kg. | $LD_{50}$=310 mg./kg. $PD_{50}$=170 mg./kg. | $ED_{50}$=18 mg./kg. | Rat—50 mg./kg. Blocked 15+30 m. Depressed 60+120 m. Cat—Blocked 25 mg./kg. |
| W.353 | $ED_{50}$=12.5 mg./kg. | Cat—Blocked 2 to 4 mg./kg. Reversed 16 mg./kg. | $LD_{50}$=490 mg./kg. $PD_{50}$=270 mg./kg. | | Rat—50 mg./kg. Blocked 15, 30, 60, 120. Cat—Blocked 25 mg./kg. |
| W.354 | $ED_{50}$=17.5 mg./kg. | Cat—Blocked 4 mg./kg. | $LD_{50}$=205 mg./kg. $PD_{50}$=114 mg./kg. | | Rat—50 mg./kg. Blocked 15, 60 m. Depressed 30 m. Cat—Blocked 25 mg./kg. |
| W.358 | $ED_{50}$=3.3 mg./kg. | Cat—Blocked 4 mg./kg. Reversed 8 mg./kg. | $LD_{50}$=325 mg./kg. $PD_{50}$=161 mg./kg. | $ED_{50}$=11 mg./kg. | Rat—100 mg./kg. Blocked 15 m. Depressed 30, 60. Cat—Blocked 25 mg./kg. |
| W.359 | $ED_{50}$=5.4 mg./kg. | Cat—Blocked 1 to 2 mg./kg. Reversed 4 mg./kg. | $LD_{50}$=580 mg./kg. $PD_{50}$=250 mg./kg. | $ED_{50}$=18 mg./kg. | Rat—50 mg./kg. Blocked 15, 30 m. Depressed 60. Cat—Blocked 25 mg./kg. |
| W.364 | $ED_{50}$=40 mg./kg. | | $LD_{50}$=210 mg./kg. | | Rat—200 mg./kg. Blocked 15, 30, 60. Cat—Depressed at 50 mg./kg. |
| W.366 | $ED_{50}$=52 mg./kg. | Not blocked at 16 mg./kg. | $LD_{50}$=176 mg./kg. | | Rat—100 mg./kg. Blocked 15, 30. Cat—Depressed 50 mg./kg. |
| W.379 | $ED_{50}$=5.9 mg./kg. | | $LD_{50}$=340 mg./kg. | | Rat—100 mg./kg. Blocked 15, 30, 60, 120 m. Cat—Blocked 12.5 mg./kg., partially. |

See footnotes at end of table.

TABLE II.—COMPARATIVE TEST RESULTS—Continued

| Cpd. Code | Reserpine Reversal Test | Adrenergic Blocking Test | LD₅₀PD₅₀ | ED₅₀ Spontaneous Activity Test | K6 Antagonism |
|---|---|---|---|---|---|
| W.380 | ED₅₀=5 mg./kg. | | LD₅₀=178 mg./kg. | ED₅₀=36 mg./kg. | Rat—50 mg./kg. Blocked 15, 30, 60+120. Cat—Depressed 25 mg./kg. |
| W.381 | ED₅₀=5.4 mg./kg. | | LD₅₀=360 mg./kg. | | Rat—100 mg./kg. Blocked 15, 30, 60, 120 m. Cat—50 mg./kg. Depressed 15, 30, 60 m. |

CODE:
W.327 = 2-(3-pyridylmethylaminomethyl)-1,4-benzodioxan dihydrochloride.
W.353 = 2-(4-pyridylmethylaminomethyl)-1,4-benzodioxan dihydrochloride.
W.354 = 2-(2-pyridylmethylaminomethyl)-1,4-benzodioxan dihydrochloride.
W.358 = 2-(β-(N-morpholino)ethylaminomethyl)-1,4-benzodioxan dihydrochloride.
W.359 = 2-(γ-(N-morpholino)propylaminomethyl)-1,4-benzodioxan dihydrochloride.
W.364 = 2-(3-pyridylmethylaminomethyl)-6(7)methyl-1,4-benzodioxan.
W.366 = 2(3)-(3-pyridylmethylaminomethyl)-5-methyl-8-isopropyl-1,4-benzodioxan.
W.379 = 2-(γ-(N-morpholino)propylaminomethyl)-6(7)-chloro-1,4-benzodioxan.
W.380 = 2(3)-(γ-(N-morpholino)propylaminomethyl)-5-methyl-8-isopropyl-1,4-benzodioxan.
W.381 = 2-(γ-(N-morpholino)propylaminomethyl)-6(7)-methyl-1,4-benzodioxan.
ED₅₀ = Effective dose 50%.
LD₅₀ = Lethal dose 50%.
ED₅₀ Spont. Act. Test = Amphetamine excitement blockade.
K6 Test = Parachlorophenylethylamine and mescaline blockade.

The preparations of the present invention will be more fully understood by referring to the following examples:

EXAMPLE I

Preparation of 2-(2-pyridylamino)methyl-1,4-benzodioxan having the structural formula:

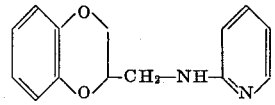

A mixture of 36.9 grams (0.2 mole) of 2-chloromethyl-1,4-benzodioxan and 38 grams (0.4 mole) of 2-aminopyridine was heated 31 hours in an oil bath maintained at 130–145° C. The mixture was left overnight at room temperature with formation of large crystals. The mixture was extracted with ethyl ether in the presence of 20 grams of sodium hydroxide dissolved in 300 ml. of water. The solids were collected, washed with water and dried to give 29.5 grams of crude product melting at 253–260° C. The ethereal layer was evaporated and the residue distilled to give a 13.7 gram recovery of 2-aminopyridine and 17 grams of residue. This residue was dissolved in methanol and treated with 6 N hydrochloric acid to give 7 grams of product melting at 255–258° C. The total crude yield of 2-(2-pyridylamino)methyl-1,4-benzodioxan was 36.5 grams (65% of theory). Recrystallization of the crude products from methanol afforded an analytical sample of the monohydrochloride melting at 265–267° C.

Analysis.—Calcd. for $C_{14}H_{15}ClN_2O_2$: N, 10.05. Found: N, 9.96.

Similarly, condensation of 2-chloromethyl-1,4-benzodioxan with m- and p-aminopyridine would give 2-(3-pyridylaminomethyl)-and 2-(4-pyridylaminomethyl)-1,4-benzodioxans. Similarly, condensation of 2-chloromethyl-8-methoxy-1,4-benzodioxan with o-, m- and p-aminopyridine would give 2-(2-pyridylaminomethyl)-8-methoxy-1,4-benzodioxan and the 3- and 4-pyridylaminomethyl isomers.

EXAMPLE II

Preparation of 2-(3-pyridylmethylaminomethyl)-1,4-benzodioxan having the structural formula:

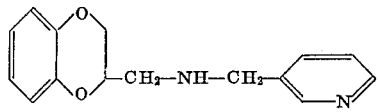

A mixture of 124.2 grams (0.67 mole) of 2-chloromethyl-1,4-benzodioxan and 145.5 grams (1.35 moles) of 3-picolylamine was heated seven hours in a glascol with the internal temperature being maintained at 115–121° C. The gummy solid which formed during the reaction was broken up in order to maintain efficient stirring. The reddish-brown mixture was left overnight at room temperature. The semisolid was dissolved by warming with water on the steam-bath. The cold aqueous solution was covered with a layer of ethyl ether and 230 mls. of concentrated hydrochloric acid was added dropwise. The aqueous portion was further extracted with ethyl ether, and the combined ethereal extracts were evaporated to give a recovery of 24.7 grams of 2 - chloromethyl - 1,4-benzodioxan. The aqueous layer was made basic by the addition of 160 grams of sodium hydroxide dissolved in 300 mls. of water. The mixture was extracted with ethyl ether, the combined ethereal extracts washed with water and the solvent evaporated to give 103.6 grams of residue. Distillation of this residue removed 15.2 grams of 3-picolylamine. The residue was dissolved in 140 mls. of 6 N hydrochloric acid and the solution evaporated to dryness. The solid was dissolved in methanol, treated with charcoal, filtered, the filtrate concentrated, diluted with ethyl ether, cooled and the crystalline product collected. The total purified yield of 2-(3-pyridylmethylaminomethyl)-1,4-benzodioxan dihydrochloride was 100.5 grams (45.4% of theory) melting at 167–177° C. The analytical sample was obtained by repeated recrystallization from methanol-ethyl ether without an improvement in the melting point.

Analysis.—Calcd. for $C_{15}H_{18}Cl_2N_2O_2$: C, 54.72; H, 5.51; N, 8.51. Found: C, 54.92; H, 5.70; N, 8.16.

Condensation of 2-chloromethyl-1,4-benzodioxan with o-, m-, p-aminoethylpyridine and o-, m- and p-aminopropylpyridine would give 2-(2-pyridylethylaminomethyl)-,
2-(3-pyridylethylaminomethyl)-,
2-(4-pyridylethylaminomethyl)-,
2-(2-pyridylpropylaminomethyl)-,
2-(3-pyridylpropylaminomethyl)-, and
2-(4-pyridylpropylaminomethyl)-1,4-benzodioxans respectively.

Similarly, condensation of 2-chloromethylbenzodioxan with o-, m- and p-aminoalkyl-N-methylpiperidines gave the corresponding 2-(N-methyl-2-piperidylalkylaminomethyl)-,
2-(N-methyl-3-piperidylalkylaminomethyl)-, and
2-(N-methyl-4-piperidylalkylaminomethyl)-1,4-benzodioxans wherein the alkyl grouping is $CH_2$, $(CH_2)_2$, $(CH_2)_3$, $(CH_2)_4$ and $(CH_2)_5$. Similarly condensation of 2-chloromethyl-1,4-benzodioxan with 2- and 3-aminoalkylpyrroles would give the corresponding 2-(2-pyrrylalkylaminomethyl)- and 2-(3-pyrrylalkylaminomethyl)-1,4-benzodioxans wherein the alkyl group consists of one to five methylene groups. Similarly condensation of 2-chloromethyl-1,4-benzodioxan with 2- and 3-aminoalkyl-1-methyl-pyrrolidines would give the corresponding 2-(1-methyl - 2 - pyrrolidinylalkylaminomethyl) - and 2 - (1-methyl - 3 - pyrrolidinylalkylaminomethyl) - 1,4 - benzodioxans. Similarly condensation of 2-chloromethyl-8-methyl-1,4-benzodioxan with o-, m-, and p-aminoalkylpyridines would give 2-(2-pyridylalkylaminomethyl)-8-methyl-1,4-benzodioxans and the 3- and 4-pyridylalkylaminomethyl isomers. Similarly condensation of 2-chloromethyl-8-methoxy-1,4-benzodioxan with o-, m-, and p-aminoalkylpyridines would give 2-(2-pyridylalkylaminomethyl)-8-methoxy-1,4-benzodioxans and the 3- and 4-pyridylalkylaminomethyl isomers. Similarly condensation of 2-chloromethyl-8-methyl-1,4-benzodioxan with o-, m-, and p-aminoalkylpyridines would give the corresponding 2 - (2 - pyridylalkylaminomethyl) - 3 - methyl - 1,4-benzodioxans. Similarly condensation of 2-(2-chloroethyl)-1,4-benzodioxan with o-, m-, and p-aminoalkylpyridines would give 2-(2-pyridylalkylaminoethyl)-1,4-benzodioxan and the 3- and 4-pyridylalkylaminoethyl isomers.

EXAMPLE III

*2-(4-pyridylmethylaminomethyl)-1,4-benzodioxan*

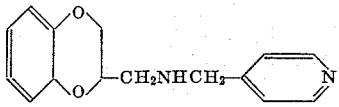

In the same manner as set forth in Example II, a mixture of 9.23 g. of 2-chloromethyl-1,4-benzodioxan and 16.2 g. of 4-aminomethylpyridine was heated six times at 115–118° C. and left overnight at room temperature. Distillation of the crude product gave 3.7 g. of 2-(4-pyridylmethylaminomethyl) - 1,4 - benzodioxan boiling at 156–160° C./0.015 mm., $n_D^{25}$ 1. 5826. Treatment of the base with dilute hydrochloric acid gave 2-(4-pyridylmethylaminomethyl)-1,4-benzodioxan dihydrochloride as a white crystalline solid melting at 188–192° C.

*Analysis.*—Calcd. for $C_{15}H_{16}N_2O_2 \cdot 2HCl$: C, 54.72%; H, 5.51%; N, 8.51%. Found: C, 54.91%; H, 5.61%; N, 8.53%.

EXAMPLE IV

*2-(2-pyridylmethylaminomethyl)-1,4-benzodioxan*

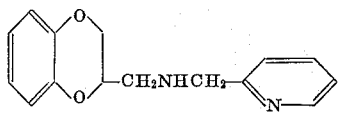

In the same manner as set forth in Example II, a mixture of 9.23 g. of 2-chloromethyl-1,4-benzodioxan and 16.2 g. of 2-picolylamine was heated 6 hours at 114.0–116.5° C. and left at room temperature overnight. The crude product was distilled to give 9.9 g. (77.3%) of 2-(2 - pyridylmethylaminomethyl)-1,4-benzodioxan boiling at 155.0–156.5° C./0.03–0.04 mm. pressure, $n_D^{25}$ 1.5772. Treatment of the base with 6 N HCl, followed by evaporation in vacuo, drying and recrystallization from methanol-ether gave 11.5 g. of 2-(2-pyridylmethylaminomethyl)-1,4-benzodioxan dihydrochloride as a white powder melting at 165–170° C. (decomposition). Despite many recrystallizations, the melting point remained wide.

*Analysis.* — Calculated for $C_{15}H_{16}N_2O_2 \cdot 2HCl$: C, 54.72%; H, 5.51%; N, 8.51%. Found: C, 55.06%; H, 5.42%; N, 8.44%.

EXAMPLE V

*2-(2-(6-methylpyridyl)methylaminomethyl)-1,4-benzodioxan*

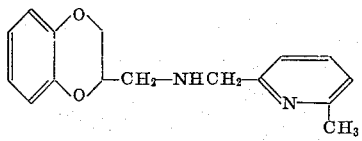

In the same manner as set forth in Example II, a mixture of 9.2 g. of 2-chloromethyl-1,4-benzodioxan and 18.3 g. of 2-aminomethyl-6-methylpyridine was heated 6 hours at 135–141° C. and left overnight at room temperature. Distillation of the crude products gave 11.8 g. (87.4%) of 2-(2-(6-methylpyridyl)-methylaminomethyl)-1,4-benzodioxan boiling at 160.0–165.5°/0.09 mm., $n_D^{25}$ 1.5727. Treatment of the base with 6 N hydrochloric acid gave 12.4 g. of 2-(2-(6-methylpyridyl)methylaminomethyl)-1,4-benzodioxan dihydrochloride as short white needles, melting at 142–145° (from methanol-ethyl ether).

*Analysis.* — Calculated for $C_{16}H_{18}NO_2 \cdot 2HCl$: C, 55.98%; H, 5.87%; N, 8.16%. Found: C, 55.59%; H, 6.15%; N, 8.02%.

EXAMPLE VI

*2-(β-(N-morpholino)ethylaminomethyl)-1,4-benzodioxan*

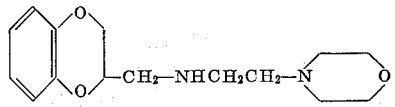

In the same manner as set forth in Example II, a mixture of 9.2 g. of 2-chloromethyl-1,4-benzodioxan and 19.5 g. of N-(β-aminoethyl)morpholine was heated 5.5 hours at 125–138° C. in an oil bath and left overnight at room temperature. Distillation of the crude basic fraction gave 10.6 g. (76.2%) of 2-(β-(N-morpholino)ethylaminomethyl)-1,4-benzodioxan as a colourless liquid boiling at 139–164° C./0.02–0.2 mm. pressure, $n_D^{25}$ 1.5380. Treatment of the free base with 6 N hydrochloric acid gave 12.4 g. of 2-(β-(N-morpholino)ethylaminomethyl) - 1,4 - benzodioxan dihydrochloride as white powder melting at 222–227° C.

*Analysis.* — Calculated for $C_{15}H_{22}N_2O_3 \cdot 2HCl$: C, 51.28%; H, 6.88%; N, 7.97%. Found: C, 51.61%; H, 7.12%; N, 7.75%.

EXAMPLE VII

*2-(γ-(N-morpholino)propylaminomethyl)-1,4-benzodioxan*

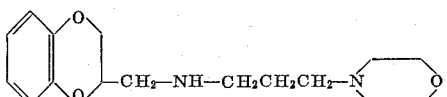

In the same manner as set forth in Example II, a mixture of 9.2 g. of 2-chloromethyl-1,4-benzodioxan and 21.6 g. of N-(γ-aminopropyl)morpholine was heated 7.5 hours at 125–130° C. and left overnight at room temperature. The crude basic fraction was distilled in vacuo to give 11.2 g. (76.7%) 2-(γ-(N-morpholino)propylaminomethyl)-1,4-benzodioxan as a colourless viscous liquid boiling at 158°/0.035–0.04 mm. $n_D^{25}$ 1.5349. Treatment of the free base with 6 N hydrochloric acid gave 12.7 g. of 2-(γ-(N-morpholino)propylaminomethyl)-1,4-benzodioxan dihydrochloride as white granules melting at 221–225° C.

*Analysis.* — Calculated for $C_{16}H_{24}N_2O_3 \cdot 2HCl$: C, 52.60%; H, 7.17%; N, 7.67%. Found: C, 52.92%; H, 7.40%; N, 7.48%.

EXAMPLE VIII

*2-(3-pyridylmethylaminomethyl)-6(7)methyl-1,4-benzodioxan*

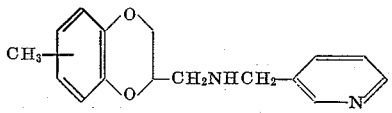

In the same manner as set forth in Example II, a mixture of 9.93 g. of 2-chloromethyl-6(7)-methyl-1,4-benzodioxan and 16.2 g. of 3-picolylamine was heated 6 hours at 118–126° C. and left overnight at room temperature. Distillation of the crude basic fraction in vacuo gave 7.7 g. of 2-(3-pyridylmethylaminomethyl)-6(7)-methyl-1,4-benzodioxan as a pale yellow viscous liquid boiling at 171–178°/0.18 mm. $n_D^{22.5}$ 1.5757. Treatment of the free base with 6 N hydrochloric acid gave 2-(3-pyridylmethylaminomethyl) - 6(7) - methyl-1,4-benzodioxan dihydrochloride melting at 137–142° C.

*Analysis.* — Calculated for $C_{16}H_{18}N_2O_2 \cdot 2HCl$: C, 55.98%; H, 5.87%; N, 8.16%. Found: C, 55.68%; H, 6.18%; N, 8.09%.

EXAMPLE IX 2-(3-pyridylmethylaminomethyl)-6(7)-chloro-1,4-benzodioxan

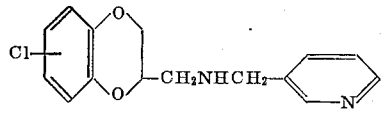

In the same manner as set forth in Example II, a mixture of 10.9 g. of 2-chloromethyl-6(7)-chloro-1,4-benzodioxan and 16.2 g. of 3-picolylamine was heated 7 hours at 123–129° C. and left overnight at room temperature. Distillation of the crude basic fraction in vacuo gave 8.2 g. (56.4%) 2 - (3 - pyridylmethylaminomethyl)-6(7)-chloro-1,4-benzodioxan as a yellow viscous liquid boiling at 175–194°/0.1–0.13 mm., $n_D^{22.5}$ 1.5883. Treatment of the base with 6 N hydrochloric acid gave 2-(3-pyridylmethylaminomethyl)-6(7)-chloro - 1,4 - benzodioxan dihydrochloride as white flakes melting at 144–150° C.

*Analysis.* — Calculated for $C_{15}H_{15}ClN_2O_2 \cdot 2HCl$: N, 7.70%. Found: N, 7.64%.

EXAMPLE X

2(3)-(3-pyridylmethylaminomethyl)-5-methyl-8-isopropyl-1,4-benzodioxan

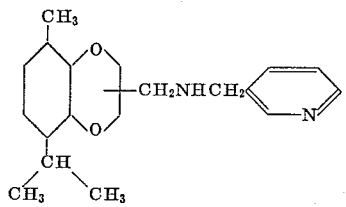

In the same manner as set forth in Example II, a mixture of 12.1 g. of 2(3)-chloromethyl-5-methyl-8-isopropyl-1,4-benzodioxan and 16.2 g. of 3-picolylamine was heated 6.5 hours at 127–136° C. in an oil bath and left overnight at room temperature. Distillation of the crude basic fraction in vacuo gave 6.7 g. (42.7%) of 2(3)-(3 - pyridylmethyl-aminomethyl) - 5 - methyl - 8 - iso-propyl-1,4-benzodioxan pale yellow liquid boiling at 185–192°/0.15–0.2 mm. $n_D^{23}$ 1.5611. Treatment of the distillate with 6 N hydrochloric acid gave 2(3)-(3-pyridylmethylaminomethyl) - 5 - methyl - 8 - isopropyl-1,4-benzodioxan dihydrochloride as pale yellow crystals melting at 142–151° C.

*Analysis.*—Calculated for $C_{19}H_{24}N_2O_2 \cdot 2HCl$: C, 59.22%; H, 6.80%; N, 7.27%. Found: C, 59.04%; H, 6.90%; N, 6.92%.

EXAMPLE XI 2-(γ-(N-morpholino)propylaminomethyl)-6(7)-chloro-1,4-benzodioxan

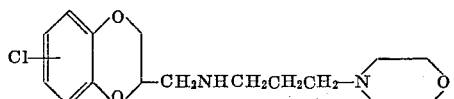

In the same manner as set forth in Example II, a mixture of 6.57 g. of 2-chloromethyl-6(7)-chloro-1,4-benzodioxan and 13.0 g. of N-(γ-aminopropyl)morpholine was heated 6 hours at 141–157° C. in an oil bath and left over the weekend at room temperature. Much coloration occurred during this period. The crude basic fraction was distilled in vacuo to give 8.1 g. (82.6%) of 2 - (γ - (N-morpholino)-propylaminomethyl) - 6(7)-chloro-1,4-benzodioxan as a colourless liquid boiling at 158–186°/0.06 mm., $n_D^{26}$ 1.5420. The product treated with hydrochloric acid as described above gave 2-(γ-(N-morpholino)propylaminomethyl) - 6(7)chloro - 1,4 - benzodioxan dihydrochloride as white flakes melting at 238–242° from methanol-ethyl ether.

*Analysis.*—Calculated for $C_{16}H_{23}ClN_2O_3 \cdot 2HCl$: C, 48.07%; H, 6.80%; N, 7.01%. Found: C, 48.28%; H, 6.83%; N, 6.68%.

EXAMPLE XII

2(3)-(γ-(N-morpholino)propylaminomethyl)-5-methyl-8-isopropyl-1,4-benzodioxan

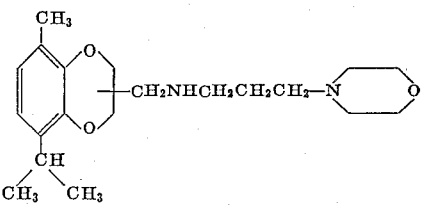

In the same manner as set forth in Example II, a mixture of 7.25 g. of 2(3)-chloromethyl-5-methyl-8-isopropyl-1,4-benzodioxan and 13.0 g. of N-(γ-aminopropyl)morpholine was heated 7.5 hours at 132–157° C. in an oil bath and left overnight at room temperature. The crude basic fraction was distilled in vacuo to give 8.2 g. (78.8%) of 2(3)-(γ-(N-morpholino)propylaminomethyl)-5-methyl-8-isopropyl-1,4-benzodioxan as a faintly yellow liquid boiling at 164.5–168.0°/0.07–0.1 mm., $n_D^{25}$ 1.5257. The distillate in anhydrous ethyl ether was treated with gaseous hydrogen chloride and recrystallized from methanol-ethyl ether to give 2(3)-(γ-(N-morpholino)propylaminomethyl) - 5 - methyl - 8 - isopropyl-1,4-benzodioxan dihydrochloride melting at 222–226°.

*Analysis.*—Calculated for $C_{20}H_{32}N_2O_3 \cdot 2HCl$: C, 57.00%; H, 8.13%; N, 6.64%. Found: C, 56.95%; H, 8.19%; N, 6.64%.

EXAMPLE XIII 2-(γ-(N-morpholino)propylaminomethyl)-6(7)-methyl-1,4-benzodioxan

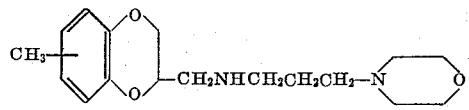

In the same manner as set forth in Example II, a mixture of 6.95 g. of 2-chloromethyl-6(7)-methyl-1,4-benzodioxan and 14.1 g. of N-(γ-aminopropyl)morpholine was heated 5.5 hours at 135–148° and left overnight at room temperature. The crude basic fraction was distilled to give 7.9 g. of 2-(γ-(N-morpholino)propylaminomethyl)-6(7)-methyl-1,4-benzodioxan as a colourless liquid boiling at 153–160°/0.09 mm., $n_D^{25}$ 1.5325. The distillate in anhydrous ether was treated with dry hydrogen chloride and the precipitate recrystallized from methanol-ethyl ether to give 2-(γ-(N-morpholino)propylaminomethyl)-6(7)-methyl - 1,4 - benzodioxan dihydrochloride melting at 213.5–218.5° C.

*Analysis.*—Calculated for $C_{17}H_{26}N_2O_3 \cdot 2HCl$: C, 53.82%; H, 7.43%; N, 7.38%. Found: C, 53.40%; H, 7.64%; N, 7.04%.

The embodiments of the invention in which an exclusive property or privilege is claimed are defined as follows:

1. 1,4-benzodioxan derivatives of the general formula:

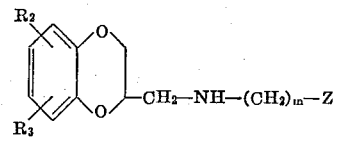

wherein $R_2$ and $R_3$ are the same or different and each represents a hydrogen or chlorine atom or a lower alkyl or lower alkoxy group, m represents zero or an integer from 1 to 5 and Z is morpholino or pyridyl having up to 1 lower alkyl substituent, joined to the —$CH_2$—NH—$(CH_2)_m$— group through a carbon or nitrogen atom and acid addition salts thereof.

2. The compound according to claim 1 which is a hydrochloride addition salt.

3. A compound according to claim 1 wherein $R_2$ is hydrogen and $R_3$ is methyl.

4. 2-(2-pyridylamino)methyl-1,4-benzodioxan.

5. The monohydrochloride of the compound as claimed in claim 4.

6. 2-(3-pyridylamino)methyl-1,4-benzodioxan.

7. 2-(4-pyridylamino)methyl-1,4-benzodioxan.

8. 2 - (2 - pyridylamino)methyl - 8 - methoxy - 1,4-benzodioxan.

9. 2-(3-pyridylamino)methyl - 8-methoxy-1,4-benzodioxan.

10. 2-(4-pyridylamino) methyl-8-methoxy-1,4-benzodioxan.

11. 2-(3-pyridylmethylaminomethyl)-1,4-benzodioxan.

12. 2-(4-pyridylmethylaminomethyl)-1,4-benzodioxan.

13. 2-(2-pyridylmethylaminomethyl)-1,4-benzodioxan.

14. 2 - (2 - (6 - methylpyridyl)methylaminomethyl)-1,4-benzodioxan.

15. 2 - (β - (N - morpholino)ethylaminomethyl) - 1,4-benzodioxan.

16. 2 - (γ - (N-morpholino)propylaminomethyl)-1,4-benzodioxan.

17. 2 - (3 - pyridylmethylaminomethyl)-methyl - 1,4-benzodioxan.

18. 2 - (3 - pyridylmethylaminomethyl) - chloro - 1,4-benzodioxan.

19. 2 - (3 - pyridylmethylaminomethyl) - 5 - methyl-8-isopropyl-1,4-benzodioxan.

20. 2 - (γ - (N - morpholino)propylaminomethyl)-chloro-1,4-benzodioxan.

21. 2 - (γ - (N - morpholino)propylaminomethyl) - 5-methyl-8-isopropyl-1,4-benzodioxan.

22. 2 - (γ - (N - morpholino)propylaminomethyl)-methyl-1,4-benzodioxan.

No references cited.

ALEX MAZEL, *Primary Examiner.*

HENRY R. JILES, *Examiner.*

R. J. GALLAGHER, *Assistant Examiner.*